United States Patent
Mariani (10) Patent No.: US 7,987,456 B2
(45) Date of Patent: Jul. 26, 2011

(54) QUALITATIVELY ANNOTATED CODE

(75) Inventor: Rico Mariani, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1314 days.

(21) Appl. No.: 11/275,690

(22) Filed: Jan. 24, 2006

(65) Prior Publication Data

US 2007/0180455 A1    Aug. 2, 2007

(51) Int. Cl.
*G06F 9/45* (2006.01)

(52) U.S. Cl. .................................................. 717/143

(58) Field of Classification Search .......... 717/101–103, 717/106–108, 143; 707/101–102; 709/220; 719/328; 715/714
See application file for complete search history.

(56) References Cited

U.S. PATENT DOCUMENTS

| | | | |
|---|---|---|---|
| 5,467,441 A | | 11/1995 | Stone et al. |
| 5,905,856 A | | 5/1999 | Ottensooser et al. |
| 6,044,217 A | * | 3/2000 | Brealey et al. ............... 717/107 |
| 6,201,948 B1 | | 3/2001 | Cook et al. |
| 6,370,589 B1 | | 4/2002 | Sieber et al. |
| 6,427,234 B1 | | 7/2002 | Chambers et al. |
| 6,675,370 B1 | | 1/2004 | Sundaresan |
| 6,715,878 B1 | | 4/2004 | Gobbi et al. |
| 6,842,877 B2 | | 1/2005 | Robarts et al. |
| 7,051,316 B2 | * | 5/2006 | Charisius et al. ............. 717/103 |
| 7,219,330 B2 | * | 5/2007 | Hogg et al. ................... 717/106 |
| 7,275,063 B2 | * | 9/2007 | Horn ............................. 707/102 |
| 7,343,379 B2 | * | 3/2008 | Marvin et al. ................ 707/101 |
| 7,490,292 B2 | * | 2/2009 | Hennum ....................... 715/714 |
| 7,562,342 B2 | * | 7/2009 | Berg et al. .................... 717/108 |
| 2003/0023957 A1 | | 1/2003 | Bau, III et al. |
| 2003/0225719 A1 | | 12/2003 | Juang et al. |
| 2004/0010776 A1 | | 1/2004 | Shah |
| 2004/0163042 A1 | | 8/2004 | Altman |
| 2004/0187140 A1 | * | 9/2004 | Aigner et al. ................. 719/328 |
| 2004/0220792 A1 | | 11/2004 | Gallanis et al. |
| 2004/0265784 A1 | | 12/2004 | Stout |
| 2004/0267760 A1 | | 12/2004 | Brundage et al. |
| 2005/0021689 A1 | * | 1/2005 | Marvin et al. ................ 709/220 |
| 2005/0081189 A1 | | 4/2005 | Krasikov |
| 2005/0091576 A1 | | 4/2005 | Relyea et al. |
| 2005/0216885 A1 | * | 9/2005 | Ireland ......................... 717/108 |
| 2006/0005177 A1 | | 1/2006 | Atkin |

FOREIGN PATENT DOCUMENTS

| | | |
|---|---|---|
| CN | 1552029 A | 12/2004 |
| WO | W003005221 A1 | 1/2003 |
| WO | 2004/077269 A2 | 9/2004 |
| WO | WO2005055103 | 6/2005 |

OTHER PUBLICATIONS

Meijer et al, "Technical Overview of the Common Language Runtime", 2000-2002, pp. 1-11, URL: <http://research.microsoft.com/~emeijer/Papers/CLR.pdf>(Technical_Overview_CLR.pdf).*

"Technical Overview of the Common Language Runtime: 25 Citations", Bibliographic data sheet, pp. 1-5 (2000) <http://citeseerx.ist.psu.edu/viewdoc/summary?doi=10.1.1.25.3489> (Tech_Overvw_CLR_Biblio.pdf) (2000).*

Office Action, Patent Office of the People's Republic of China, Application No. 200680051587.2, dated Jul. 24, 2009, 8 pages.

(Continued)

*Primary Examiner* — Tuan Anh Vu (57) ABSTRACT

Data associated with at least one module of code may be annotated in such a manner as to provide guidance regarding usage of the module.

1 Claim, 4 Drawing Sheets

OTHER PUBLICATIONS

Office Action, EP Patent Office, Application No. 06848210.8-1243, dated Aug. 4, 2009, 6 pages.

Extended European Search Report, EP Patent Office, Application No. 06848210.8-1243, dated May 27, 2009, 8 pages.

Ioannis Doumanis, Evaluating Humanoid Animated Agents in Mobile Guide Applications, Research Topic-School of Computer Science, Middlesex University, London, England, retrieved 2006 at <<http://www.cs.mdx.ac.uk/research/PhDArea/research_students/Ioannis/id_profile.html>>, last viewed on Jan. 24, 2006, pp. 1-2.

"Reporting instruments" retrieved at <<http://www.issco.unige.ch/ewg95/node89.html>>, last viewed on Jan. 24, 2006, pp. 1-6.

"Wallaby" SDK Documentation Content Strategy, retrieved at <<http://faculty.washington.edu/farkas/TC407/syllabus.htm/WallabySpecification.doc>>, last viewed on Jan. 24, 2006, 16 pages.

Response to EP Office Action, Application No. 06848210.8, dated Nov. 11, 2009, 10 pages.

Response to Chinese First Office Action, Application No. 200680051587.2, dated Dec. 1, 2009, 15 pages.

Chinese Second Office Action, Application No. 200680051587.2, dated Apr. 13, 2010, 12 pages.

Response to Chinese Second Office Action, Application No. 200680051587.2, dated May 31, 2010, 3 pages.

International Search Report PCT/US2006/049353, Jun. 21, 2007, pp. 1-7.

Ionnis Doumanis; Evaluating Humanoid Animated Agents in Mobile Guide Application http://www.cs.mdx.ac.uk/research/PhDArea/research_students/Ioannis/id_profile.html.

Marvin Martian; "Wallaby" SDK Documentation Content Strategy http://faculty.washington.edu/farkas/TC407/Wallaby%20Specification.doc., (May 17, 2005).

Reporting instruments http://www.issco.unige.ch/ewg95/node89.html, (Sep. 1995).

EP Office Action, Application No. 06848210.8, dated Apr. 18, 2011, 6 pages.

* cited by examiner

QUALITATIVELY ANNOTATED CODE

BACKGROUND

Applications, programs, functions, and other assemblages of programmable and executable code are typically written for third party (i.e., "customer") usage. Therefore, effective code is written in such a manner that third party usage scenarios are enabled and meet third party expectations.

SUMMARY

As applications, programs, functions, and other assemblages of programmable and executable code are modularized, data associated with at least one such module of code may be annotated so as to provide qualitative guidance regarding usage of the module.

DESCRIPTION OF THE DRAWINGS

The present description references the following figures.

DETAILED DESCRIPTION

Tools, systems, and methodologies for producing annotated code and using the annotations to provide guidance regarding the usage of the code are described herein. Further, the description pertaining to annotating at least portions of code and using the annotations may relate to tools, systems, processes, instructions, techniques, and routines that may be utilized to inform customers of an intended use of portions of code. That is, by annotating at least portions of code with a persona or classification that is indicative of a, e.g., functional intent of the respective portions of code, customers may be empowered to write a highly efficient application, program, function, or other assemblage of programmable and executable code that is not likely to break or crash. Further still, such tools, systems, and processes may be implemented in one or more devices, or nodes, in a network environment.

"Module," as described herein, may refer to separate entities such as methods, classes, DLLs (dynamic link libraries), frameworks, etc., that may utilize common physical and/or logical resources.

"Assemblage," as described herein, may refer to a unit of deployment for code.

Figure 1:
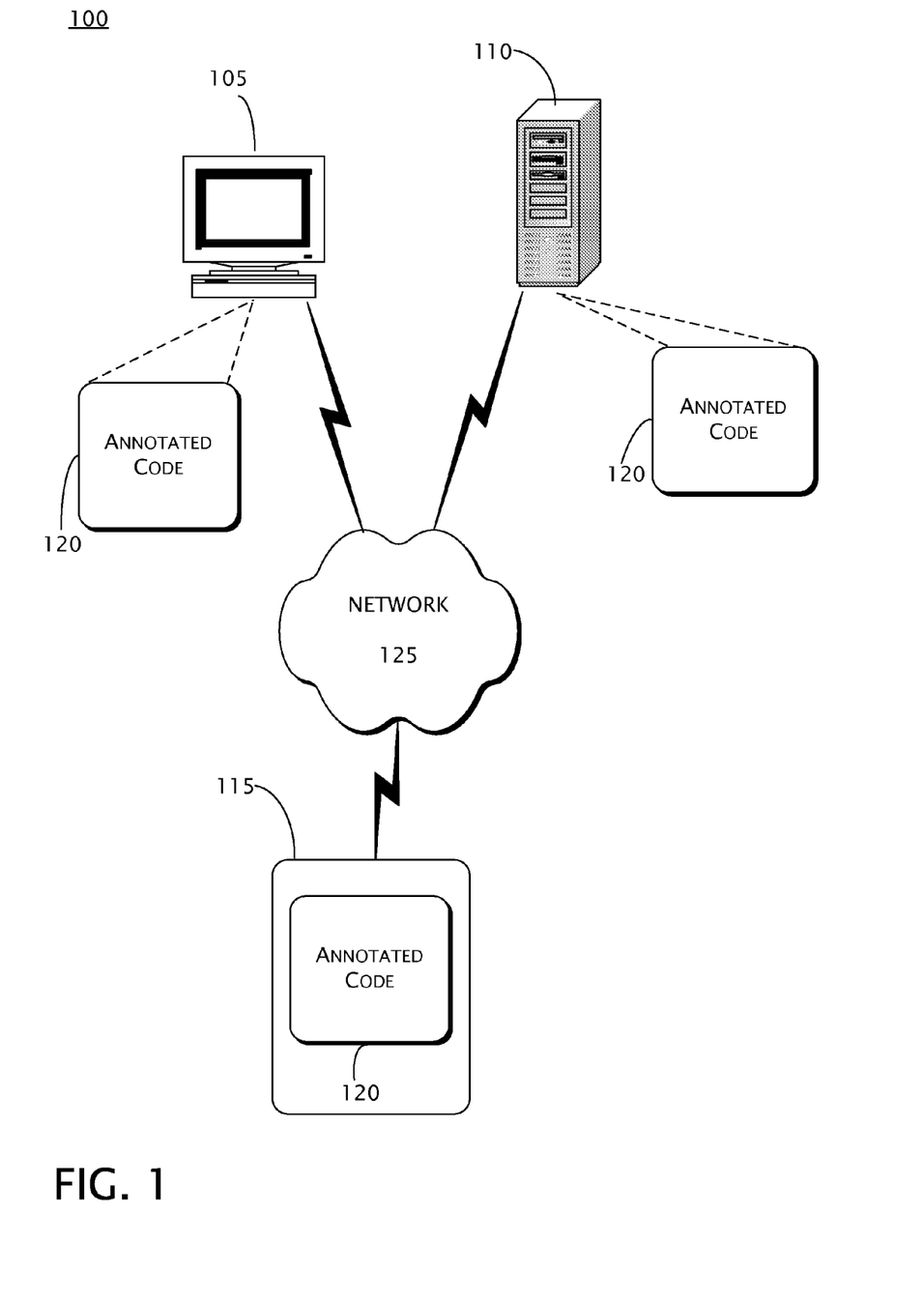
FIG. 1 shows devices communicating over a network, with the devices implementing example technologies for at least one of producing and exploiting annotated code.

FIG. 1 shows example network environment 100 in which example technologies may be implemented for producing annotated code and exploiting the annotations to provide guidance regarding the usage of the code. However, such example technologies are not limited to network environments. Such technologies may include, but are not limited to, tools, methodologies (e.g., techniques), and systems, associated with qualitatively annotated code 120, as described herein. In FIG. 1, client device 105, server device 110, and "other" device 115 may be communicatively coupled to one another via network 125; and, further, at least one of client device 105, server device 110, and "other" device 115 may be capable of implementing the aforementioned technologies.

Client device 105 may represent at least one of a variety of known computing devices, including a desktop personal computer (PC), workstation, mainframe computer, Internet appliance, set-top box, or gaming console, that is able to implement example technologies for at least one of producing and utilizing qualitatively annotated code 120. Client device 105 may further represent at least one device that is capable of being associated with network 125 by a wired and/or wireless link, including a mobile (i.e., cellular) telephone, personal digital assistant (PDA), laptop computer, etc. Further still, client device 105 may represent the client devices described above in various quantities and/or combinations thereof. "Other" device 115 may also be embodied by any of the above examples of client device 105.

Server device 110 may represent any device that is capable of providing any of a variety of data and/or functionality to client device 105 or "other" device 115 in accordance with at least one implementation for at least one of producing and utilizing qualitatively annotated code 120. The data may be publicly available or alternatively restricted, e.g., restricted to only certain users or only if an appropriate subscription or licensing fee is paid. Server device 110 may be at least one of a network server, an application server, a blade server, or any combination thereof. Typically, server device 110 may represent any device that may be a content source, and client device 105 may represent any device that may receive such content either via network 125 or in an off-line manner. However, according to the example implementations described herein, client device 105 and server device 110 may interchangeably be a sending node or a receiving node in network environment 100. "Other" device 115 may also be embodied by any of the above examples of server device 110.

"Other" device 115 may represent any further device that is capable of developing and/or utilizing qualitatively annotated code 120 according to one or more of the example technologies described herein. That is, "other" device 115 may represent a device that is capable of annotating at least a portion of code with a persona or classification that is indicative of, e.g., a functional intent of the respective portions of code and/or provide a customer with guidance regarding the usage of the portion of code based on the assigned persona. Thus, "other" device 115 may be a computing or processing device having at least one of an operating system, an interpreter, converter, compiler, or runtime execution environment implemented thereon. These examples are not intended to be limiting in any way, and therefore should not be construed in that manner.

Network 125 may represent any of a variety of conventional network topologies and types, which may include wired and/or wireless networks. Network 125 may further utilize any of a variety of conventional network protocols, including public and/or proprietary protocols. Network 125 may include, for example, the Internet as well at least portions of one or more local area networks (also referred to, individually, as a "LAN"), such as an 802.11 system or, on a larger scale, a wide area network (i.e., WAN"); or a personal area network (i.e., PAN), such as Bluetooth.

Computer architecture in at least one of devices 105, 110, and 115 has typically defined computing platforms in terms of hardware and software. Software for computing devices has been categorized into groups, based on function, which may include: a hardware abstraction layer (alternatively referred to as a "HAL"), an operating system (alternatively referred to as "OS"), and applications.

A runtime execution environment may reside between an OS and an application, program, function, or other assemblage of code. The runtime execution environment may serve as a space in which the application, program, function, or other assemblage of code may execute specific tasks on any one or more of processing devices 105, 110, and 115. More particularly, a runtime execution environment may enhance the reliability of the execution of an application, program, function, or other assemblage of code on a growing range of processing devices 105, 110, and 105, including servers, desktop computers, laptop computers, and mobile processing/communication devices by providing a layer of abstraction and services for an application running on such devices, and by further providing the application with capabilities including memory management and configuration thereof.

A runtime execution environment may serve as at least one of a programming and an execution platform. As a programming platform, a runtime execution environment may compile one or more targeted applications, programs, functions, or other assemblages of code, which may be written in one of multiple computing languages, into an intermediate language (hereafter "IL") or bytecode. IL is typically independent of the platform, and the central processing unit (hereafter "CPU") executes IL. In fact, IL is a higher level language than many CPU machine languages.

As an execution platform, a runtime execution environment may interpret compiled IL into native machine instructions. A runtime execution environment may utilize either an interpreter or a compiler (e.g., "just-in-time," alternatively "JIT," compiler) to execute such instructions. Regardless, the native machine instructions may then be directly executed by the CPU. Since IL is CPU-independent, IL may execute on any CPU platform as long as the OS running on that CPU platform hosts an appropriate runtime execution environment.

Alternatively, at least portions of applications, programs, functions, or other assemblages of code may be precompiled and installed as a native image file in the runtime execution environment, thus circumventing CPU consumption required for JIT compilation. Effectively, the precompiled portions are software components that are distributed in an IL format (e.g., assemblies, methods, or types) rather than in a native platform execution format. A source of such precompiled IL may be disposed in either of a non-managed execution environment or a separate implementation of a runtime execution environment on a same or separate one of devices 105, 110, and 115. The source may deploy the precompiled IL during or before install time for the application, program, method, function, or other assemblage of programmable and executable code to which the precompiled IL corresponds.

Regardless, examples of runtime environments, in which technologies for producing and/or utilizing qualitatively annotated code 120 may be implemented, include: Visual Basic runtime environment; Java® Virtual Machine runtime environment that is used to run, e.g., Java® routines; or Common Language Runtime (CLR) to compile, e.g., Microsoft .NET™ applications into machine language before executing a calling routine. However, this listing of runtime environments provides examples only. The example technologies described herein are not limited to just these managed execution environments. More particularly, the example implementations are not just limited to managed execution environments, for one or more examples may be implemented within testing environments and/or unmanaged execution environments.

An application, program, function, or other assemblage of code compiled into IL may be referred to as "managed code," and that is why a runtime execution environment may be alternatively referred to as a "managed execution environment." It is noted that code that does not utilize a runtime execution environment to execute may be referred to as a native code application.

Figure 2:
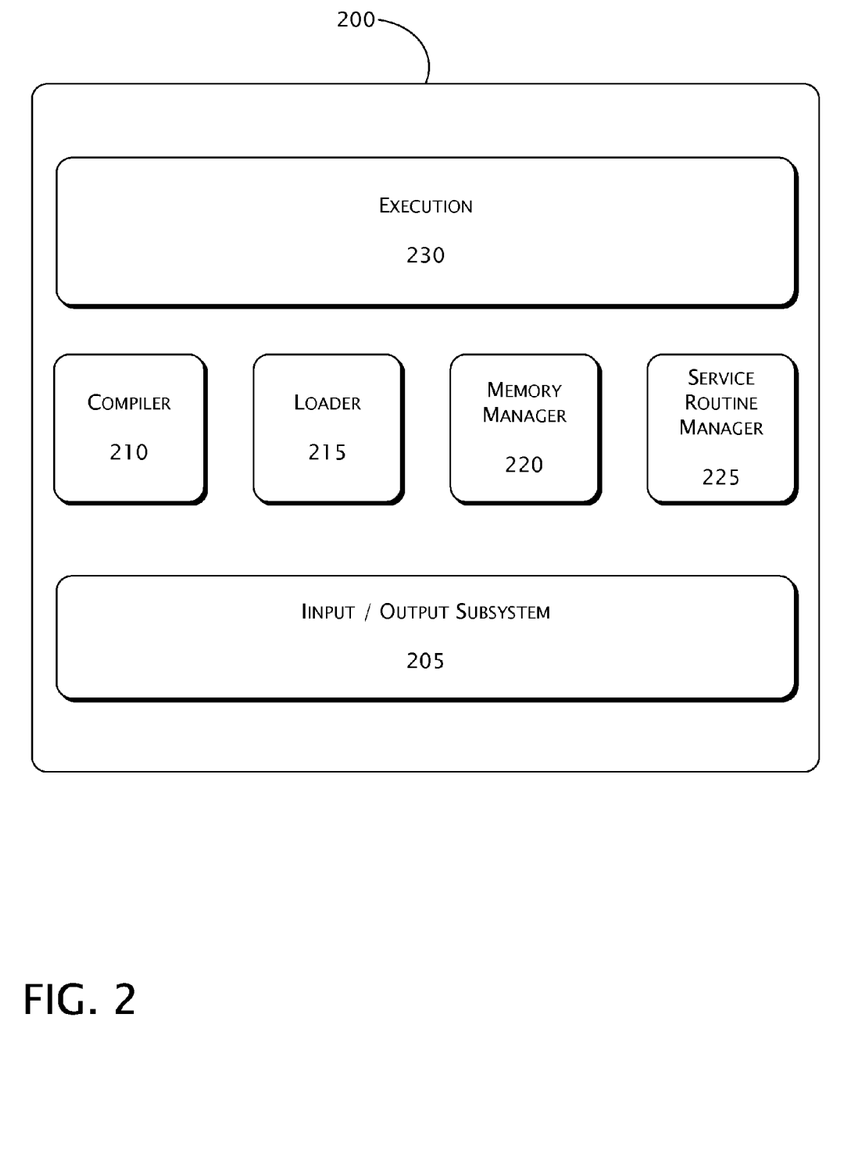
FIG. 2 shows an example of an execution environment for implementing example technologies for at least one of producing and exploiting annotated code.

FIG. 2 shows an example of runtime execution environment 200 in which technologies for developing and utilizing qualitatively annotated code 120 (see FIG. 1) may be implemented.

According to at least one example implementation, runtime execution environment 200 may facilitate execution of managed code for a computing device platform. Managed code may be considered to be part of a core set of application-development technologies, and may further be regarded as an application, program, function, or other assemblage of programmable and executable code that is compiled, or loaded, for execution in runtime execution environment 200 to provide a corresponding service to the computing device platform. In addition, runtime execution environment 200 may translate managed code at an interpretive level into instructions that may be proxied and then executed by a processor. Alternatively, managed code may be executed via an interpreter or a compiler, or a form of a compiler designed to run at install time as a native image. A framework for runtime execution environment 200 also provides class libraries, which may be regarded as software building blocks for managed applications.

Runtime execution environment 200 may provide at least partial functionality that may otherwise be expected from a kernel, which may or may not be lacking from a computing device platform depending upon resource constraints for a particular one of devices 105, 110, and 115 (see FIG. 1). Thus, at least one example of runtime execution environment 200 may implement the following: input/output (hereafter "I/O") routine management, compiling, memory management, and service routine management. Thus, runtime execution environment 200 may include I/O component 205, compiler 210, at least one memory management component 215, service routine management component 220, and execution component 225. These components, which are to be described in further detail below, are provided as examples, which are not intended to be limiting to any particular implementation of runtime execution environment 200, and no such inference should be made. Thus, the components may be implemented in examples of runtime execution environment 200 in various combinations and configurations thereof.

I/O component 205 of runtime execution environment 200 may provide at least one of synchronous or asynchronous access to physical resources (e.g., processor and peripherals) and logical resources (e.g., drivers, or physical resources partitioned in a particular manner) associated with the computing device platform. More particularly, I/O component 205 may provide runtime execution environment 200 with robust system throughput and further streamline performance of an application, program, function, or other assemblage of programmable and executable code from which an I/O request originates.

Compiler 210 may refer to a component within runtime execution environment 200 that may interpret compiled IL into native machine instructions for execution in runtime execution environment 200. Further, in accordance with at least one alternative implementation of technologies for developing and utilizing qualitatively annotated code 120, compiler 210 may dynamically instrument for profiling/recording purposes, for various purposes, the behavior of modules of code associated with an application, program, function, or other assemblage of programmable and executable code. The modules of code may or may not be loaded into runtime execution environment 200. If the modules of code are loaded into runtime execution environment 200, the profiling may include recording or otherwise tracking interaction between the respective modules of code and one or more components of runtime execution environment 200. Such interaction between a respective module of code and a particular component of runtime execution environment 200 includes the receiving and transmitting of data, parameters, and state. The profiling may be performed without touching or affecting an executable portion of the code modules, and may be performed at compile time, initial runtime, or at any time thereafter relative to execution of an executable portion of the execution paths.

Loader 215 may refer to an assembly manager that may be invoked to locate and read assemblies as needed. Loader 325 may be disposed in execution environment 200, although at least one implementation of an unmanaged execution environment (i.e., OS) may include loader 325 therein. Loader 215 may garner precompiled IL during deployment or install time, for loading into runtime execution environment 200. Thus, according to at least one alternative implementation of runtime execution environment 200, loader 215 may effectively serve as an entry point for precompiled IL into runtime execution environment 200.

Memory management component 220 may be referred to as a "garbage collector," which implements garbage collection. Garbage collection may be regarded as a robust feature of managed code execution environments by which an object is automatically freed (i.e., de-allocated) if, upon a sweep or scan of a memory heap, an object is determined to no longer be used by an application, program, function, or other assemblage of code. Further functions implemented by memory management component 220 may include: managing one or more contiguous blocks of finite volatile RAM (i.e., memory heap) storage or a set of contiguous blocks of memory amongst the tasks running on the computing device platform; allocating memory to at least one application, program, function, or other assemblage of programmable and executable code running on the computing device platform; freeing at least portions of memory on request by at least one of the applications, programs, functions, or other assemblages of code; and preventing any of the applications, programs, functions, or other assemblages of code from intrusively accessing memory space that has been allocated to any of the other applications, programs, functions, or other assemblages of code.

Service routine manager 225 may be included as at least a portion of an application support layer to provide services functionality for physical and logical resources associated with the computing device platform. Example technologies (e.g., tools, methodologies, and systems) for developing and/or utilizing qualitatively annotated code 120 may be managed by service routine manager 225. That is, such technologies may be implemented either singularly or in combination together by compiler 210 (as referenced above), service routine manager 225, or some other component of runtime execution environment 200, in accordance with various alternative implementations of such technologies. Such contribution by service routine manager 225 may be made without touching or affecting an executable portion of the modules of code, at compile time, initial runtime, or at any time thereafter relative to execution of an executable portion of the code modules.

Execution component 230 may enable execution of managed code for the computing device platform. More particularly, with regard to implementation of technologies for developing and/or utilizing qualitatively annotated code 120, execution component 230 may serve as an exemplary component within runtime execution environment 200 that may implement one or more of the tools, systems, and processes for annotating and/or interpreting an annotation for one or more code modules at compile time, initial runtime, or at any time thereafter during execution of an executable portion of the code modules.

Figure 3:
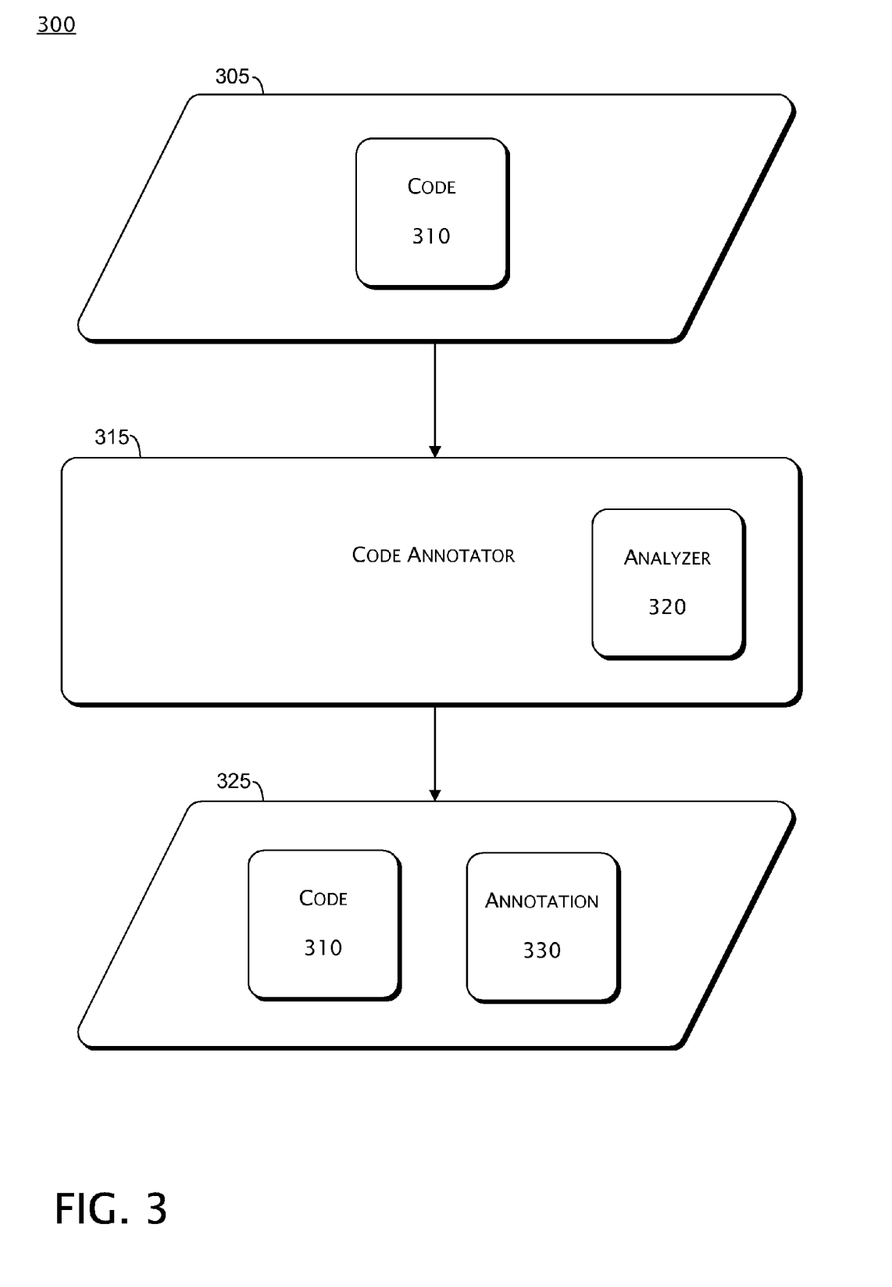
FIG. 3 shows a sample data flow in relation to a tool for producing an example of annotated code.

FIG. 3 shows example data flow 300 for implementing one or more example technologies associated with qualitatively annotated code 120 (see FIG. 1). More particularly, qualitatively annotated code 120 is code that has been assigned an archetypical persona or classification that is germane to at least one qualitative performance characteristic of the particular module of code. Such qualitative performance characteristic may include a functional intent of the particular module of code. By indicating a "functional intent," the persona or classification may describe one or more context in which the particular module of code is appropriate for use, rather than describing a precise function thereof. Regardless, references to such performance characteristics are provided as non-limiting examples only. Qualitative security characteristics may also serve as at least a partial basis upon which the personae or classifications are assigned to respective modules of code.

Further, qualitatively annotated code 120 may be managed code that is compiled by, or pre-compiled for, runtime execution environment 200. Regardless, potential performance-related failures for respective modules of the code may be foreseen, if not clearly anticipated, and therefore circumvented to a desirable extent.

To that end, qualitatively annotated code 120 may provide generalized guidance that is robust. That is, by providing qualitative guidance as opposed to quantitative guidance, whereby strict rules corresponding to a respective module of code must be modified along with any revisions to the code, the persona or classification corresponding to qualitatively annotated code 120 may tolerate changes to the code and therefore serve as prescriptive guidance rather than prohibitive guidance.

Further still, the general guidance provided by the respective personae or classifications assigned to respective modules of qualitatively annotated code 120 may indicative the preferred methods that may be called by code 120, behaviors that code 120 may invoke, the dependencies that code 120 may have, or even indicate a prescribed degree of complexity based on, e.g., a complexity parameter such as cyclomatic complexity. Of course, such guidance is provided as examples only to illustrate the broad range of programming factors that may be influenced by a persona or classification assigned to qualitatively annotated code 120.

Regardless, in the following description, various operations will be described as being performed by components associated with code annotating tool 315. The operations that are described with respect to any particular one of these components may be carried out by the component itself, in combination with other components associated with the tool, or by the particular component in cooperation with one or more components of runtime execution environment 200 (see FIG. 2). In addition, the operations of each of the component of code annotating tool 315 may be executed by a processor or processors and implemented as hardware, firmware, or software, either singularly or in various combinations together.

Example implementations of code annotating tool 315 may be implemented in an off-line manner, separate from any of the components of runtime execution environment 200. However, at least one implementation of code annotating tool 315 may be incorporated with any of a portion of compiler 210, service routine manager 220, or some other component of runtime execution environment 200, either singularly or in combination together. In such an implementation, code annotating tool 315 may be executed or processed by execution component 225.

Module 305 may refer to one or more modules of executable instructions corresponding to an application, program, function, or other assemblage of code being executable in accordance with, e.g., execution component 230 in runtime execution environment 200. More particularly, module 305 may refer to an entity such as methods, classes, DLLs (dynamic link libraries), frameworks, etc.

Code 310 may refer to an application programming interface (alternatively referred to as an "API" hereafter) that is associated with module 305. More particularly, API 310 may be regarded as one or more methods or routines that are exposed by a class and used by an application, program, method, function, or other assemblage of code to direct the performance of procedures by runtime execution environment 200 or even an operating system.

Code annotating tool 315 may refer to a multi-functional tool that may be capable of facilitating the annotation of modules of code corresponding to an application, program, function, or other assemblage of code in accordance with an appropriate persona or classification; facilitating the monitoring, recording and/or profiling activity of such a module of code in accordance with at least one of a functional intent of the respective module or an assigned persona or classification; and providing guidance regarding usage of the module of code in accordance with at least one of an intent of the module of code or a persona or classification assigned to the module of code.

Analyzer 320, which may be disposed within or otherwise functionally associated with code annotating tool 315, may be regarded as a component that is capable of associating an appropriate annotation or classification with a module of code based on characteristics including, but not limited to, a functional intent of the module of code. An analyzer may further be capable of reading an annotation associated with a module of code corresponding to an application, program, function, or other assemblage of code, and is still further capable of communicating the content of such annotation to a user either singularly or in combination with another component of code annotating tool 315.

Module 325 may refer to a module of executable instructions corresponding to an application, program, function, or other assemblage of code being executable in accordance with, e.g., execution component 230 in runtime execution environment 200. More particularly, module 325 may refer to an entity such as methods, classes, DLLs (dynamic link libraries), frameworks, etc. that includes code 310 and an associated annotation 330.

Annotation 330 may refer to a text file that is associated with code 310. In particular, annotation 330 may be a text file (e.g., XML) listing a persona or classification that has been assigned to code 310 by code annotating tool 315; or annotation 300 may be a text file that articulates, e.g., functional characteristics or intent of code 310. Annotation 330 is associated with code 310, and therefore may be received into, and compiled by, runtime execution environment 200 attached to code 310 as part of module 325. Alternatively, annotation 330, though associated with code 310, may be pre-compiled and thus received into runtime execution environment 200 separate from code 310. For example, annotation 330 may be received into runtime execution environment 200 on-line via network 125 (see FIG. 1) from a developer or administrator for executable code 200; or, annotation 330 may be received into runtime execution environment 200 in an off-line manner (e.g., via a transportable, computer-readable medium) from either of the aforementioned developer or administrator.

As stated above, annotation 330 may list a persona or classification that has been assigned to code 310. Such persona or classification may provide data indicative of a functional intent of code 310 (e.g., API, method, or routine). That is, the data may indicate one or more contexts in which the use of code 310 may be appropriate. Further, in order to qualitatively inform a customer of an intended use of code 310 for superior code generation or exceptional code profiling, the personae or classifications associated by analyzer 320 are typically related to each other with regard to the analyzed characteristics and the personae or classifications are typically regarded as approximations that provide reliable guidance but also permit for exceptions and/or creativity.

Examples of a persona or classification assigned to code 310 may include, as illustrative examples only: inner-loop code, throughput code, interactive code, and startup code. The nomenclature for such personae is provided only as an example. The personae or classifications may be assigned any of a variety of names, though it may be preferable to assign a name that is indicative of a functional intent or other functional characteristic of code for the respective persona or classification.

An inner-loop code persona may indicate that code 310 is likely to be called in a bigger loop by a client application, program, function, or other assemblage of code, as part of a bigger algorithm. More particularly, inner-loop code 310 may be regarded as code that is "inner-most" to a corresponding application, program, function, or other assemblage of code. Examples of which include comparison functions, hashing functions, low-level formatting functions, etc. For such code, memory allocation may be discouraged. Annotation 330 associated with inner-loop code 330 may advise that such code may be called by code that is assigned any of the example code personae/classifications described below (e.g., throughput, interactive, and startup).

A throughput code persona may indicate that code 310 is likely to be used in a batch process or service process, such as on a webpage. More particularly, throughput code 310 may be regarded as code for which temporary objects may be created and, therefore, some memory allocation may be permitted. Such code may be typically implemented by a webpage or business-logic, and an intention of such code is to execute regardless of the cost in resources (e.g., memory). An example of guidance for throughput code is that throughput code is not functionally compatible with inner-loop code, and therefore may not be called by inner-loop code. Therefore, annotation 330 associated with throughput code 310 may advise against, or even prohibit, calling code that has been assigned the inner-loop persona or classification.

An interactive code persona may indicate that code 310 is likely to be used by part of an application, program, function, or other assemblage of code that is driven by interactive events. More particularly, interactive code 310 may be regarded as code for which modes may change suddenly, and an intention of such code is to use as few resources (e.g., memory) as possible during execution thereof. An example of guidance for interactive code is that interactive code may call inner-loop code. Therefore, annotation 330 associated with interactive code 310 may advocate calling code that has been assigned the inner-loop persona or classification. A further example may include interactive code calling throughput code, but this is an unlikely scenario since interactive code is intended to be frugal with regard to resources used and throughput code is intended to persist regardless of the cost in resources. Therefore, annotation 330 associated with interactive code 310 may further discourage calling code that has been assigned the throughput code persona or classification.

A startup code persona may indicate that code 310 is likely to appear on a startup path for a corresponding application, program, function, or other assemblage of code. More particularly, startup code 310 may be regarded as code that is sensitive to dependencies and input/output (IO). Annotation 330 associated with startup code 310 may discourage, or deny, calls from code that has been assigned another persona or classification.

Accordingly, when programming an application, program, function, or other assemblage of programmable/executable code that includes a call to code 310, annotation 330 may provide a programming customer with guidance that includes, but is not necessarily limited to interactive guidance, diagnostic (i.e., profiler) guidance, code generating guidance, code maintenance guidance, and inference guidance. All of these categories of guidance described above may be implemented by analyzer 320 based on, e.g., a known functional intent of code 310. These example categories of guidance are described below.

Interactive programming guidance may provide an indication of the functional compatibility of code 310 with a more recently called implementation of code 310, which may or may not be, e.g., an API, method, or routine to which another persona or classification has been assigned. Alternatively, interactive programming guidance may provide a programming rule that warns of potential programming violations for the persona or classification assigned to code 310, relative to the aforementioned more recently called implementation of code 310.

Diagnostic (i.e., profiler) guidance may provide reports pertaining to measured programming events for code 310 and/or the persona or classification that has been assigned to code 310. More particularly, based on a record of programming events pertaining to code 310 and/or the persona or classification to which code 310 has been assigned, diagnostic/profiler guidance may provide a statistical analysis and/or recommendation regarding the usage of code 310. The analysis and/or recommendation may even include a measurement of programming events pertaining to code 310 against previously recommended guidance. The record of programming events may be generated by, e.g., analyzer 320, and the programming events may include, but are in no way limited to: functions by which code 310 has been previously called; and a number of times that code 310 has been called for a particular application, program, function, or other assemblage of code; etc.

Code generating guidance may provide programming guidance for a compiler (e.g., compiler 210; see FIG. 2). For example, code generating guidance may provide a likely indication of a functional intent of code 310, and therefore the compiler may compile code 310 in such a manner to exploit the characteristics of compiled code 310. More particularly, code generating guidance articulated by annotation 330 may indicate that a functional intent of interactive code 310 is to use as few resources as possible, and therefore the compiler may be guided to compile code 310 in a compact manner to reduce space used thereby. Alternatively, code generating guidance may indicate that a functional intent of inner-loop code 310 is to not have memory allocated thereto, and therefore the compiler may be guided to compiler 305 in a manner to optimize for speed. These scenarios are provided as examples only, and should not be construed as limiting in any manner.

Code maintenance guidance may provide programming guidance that provides one or more rationale for the persona or classification that has been assigned to code 310. Such guidance may further provide an explanation of a persona or classification that may be assigned to code 310 if at least a portion of code 310 was to be changed. Thus, code maintenance guidance may, in part, guide a transition from code assigned a particular persona or classification to code assigned to another persona or classification.

Inference guidance may provide, when code annotating tool is utilized as part of a static analysis tool, a retroactive annotation for code 310. That is, for an application, program, function, or other assemblage of programmable/executable code that has already been compiled, analyzer 320 may retroactively assign a persona or classification for code 310. Thus, an analysis of code 310 as well as functions that have called code 310 and functions that have been called by code 310 may be provided to a customer.

Figure 4:
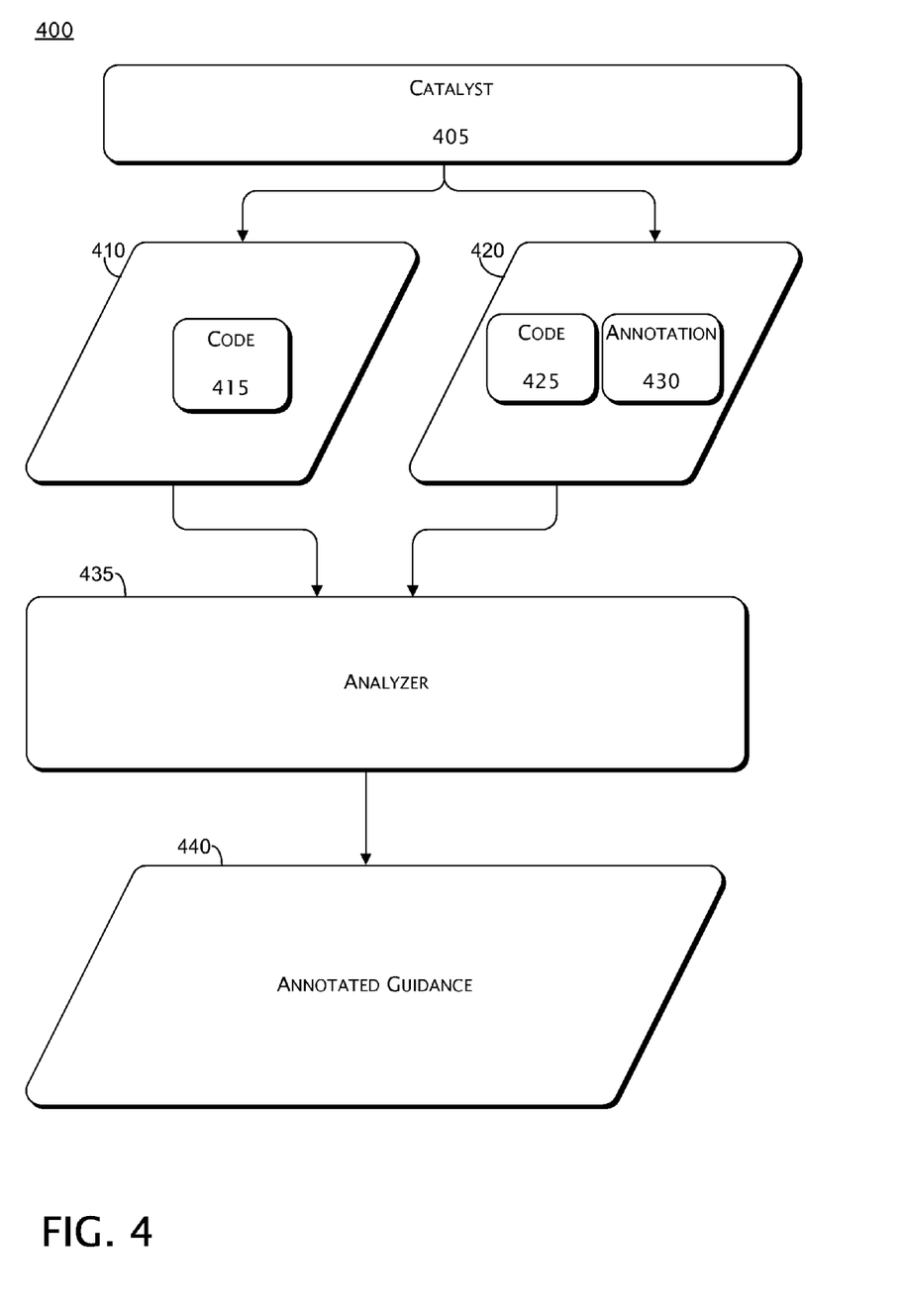
FIG. 4 shows an example data flow in relation to a tool for exploiting annotated code.

FIG. 4 shows example data flow 400 for producing and utilizing at least one example implementation of qualitatively annotated code 120 (see FIG. 1). More particularly, example data flow 400 may be implemented for either of a code generator or a code enforcer.

In the following description, various operations will be described as being performed by components associated with either of runtime execution environment 200 (see FIG. 2) or code annotating tool 315 (see FIG. 3), although the reference numbers in FIG. 4 may differ from those of the prior figures. The operations that are described with respect to any particular one of these components may be carried out by the component itself, in combination with other components associated with the tool, or by the particular component in cooperation with one or more components of runtime execution environment 200. In addition, the operations of each of the component of code annotating tool 315 may be executed by a processor or processors and implemented as hardware, firmware, or software, either singularly or in various combinations together.

A first example implementation of data flow 400 relates to a manual or automatic code generator.

Block 405 may refer to a catalytic action that is taken, or about to be taken, that may affect a module of code, such as an API, method, or routine. Such catalytic action may include the module of code being called by another module of code.

Data module 410, therefore, may refer to one or more modules of executable instructions corresponding to an application, program, function, or other assemblage of code being executable in accordance with, e.g., execution component 230 in runtime execution environment 200. More particularly, data module 410 may refer to an entity such as methods, classes, DLLs (dynamic link libraries), frameworks, etc.

Code 415 may refer to an API, method, or routine that is associated with data module 410. More particularly, code 415 may be exposed by a class and used by an application, program, method, function, or other assemblage of programmable and executable code to direct the performance of procedures by runtime execution environment 200 or even an operating system.

Analyzer 435 may refer to a component that is capable of associating an appropriate annotation or classification with a module of code based on characteristics including, but not limited to, a functional intent of the module of code. Analyzer 425 may be associated with a more comprehensive tool for developing and/or utilizing annotated code or, alternatively, may even be implemented as a component (e.g., compiler) of runtime execution environment 200.

Regardless, having received code 415, incorporated within or separate from data module 410, analyzer 435 may implement a predetermined algorithm for determining a functional intent or other functional characteristics of code 415 to thereby associate a persona or classification with code 415. Basing the persona or classification of code 415 on a functional intent thereof is described as an example only.

Annotated guidance 440 may refer to a text file that is associated with code 310. In particular, annotation 440 may be a text file (e.g., XML) listing a persona or classification that has been assigned to code 415 by code annotating tool 315. Alternatively, annotated guidance 440 may be presented to a customer as part of a user interface in the form of, for example, a dialog box or drop-down menu that articulates the rule or guidance associated with code 415, color-coded fonts (e.g., green for acceptable, yellow for caution, and red for prohibited).

A second example implementation of data flow 400 also relates to a manual or automatic code generator.

Block 405 may refer to a catalytic action that is taken, or about to be taken, that may affect a module of code, such as an API, method, or routine. Such catalytic action may include the module of code being compiled or being submitted to be compiled.

Data module 420, similar to data module 410, may refer to one or more modules of executable instructions, such as methods, classes, DLLs (dynamic link libraries), frameworks, etc.

Code 425, similar to code 425, may refer to an API, method, or routine that is associated with data module 420.

Annotation 430 may refer to a text file that is associated with code 425, in the form of, e.g., a text file (e.g., XML), to list a persona or classification that has been assigned to code 425 based on a functional intent or other specified functional characteristic of code 425. More particularly, according to this second example of data flow 400, code 425 has already been annotated by either of a manual process or an automated process, as described herein.

Analyzer 435 may refer to a component that is capable of reading annotation 430 associated with code 425. Thus, as part of runtime execution environment 200, analyzer 435 may provide annotated guidance 440 for compiler 210 (see FIG. 2) so that code 425 may be compiled in order to be functionally compatible with the functional intent articulated in annotation 430.

A third example implementation of data flow 400 relates to a manual or automatic code profiler or diagnostic tool.

Block 405 may refer to a catalytic action that is taken, or about to be taken, that may affect a module of code, such as an API, method, or routine. In the context of a code profiler, such catalytic action may include previously compiled code being submitted to a profiling tool for analysis or any other form of examination or study.

Data module 410 may refer to one or more modules of executable instructions, such as methods, classes, DLLs (dynamic link libraries), frameworks, etc.

Code 415 may refer to an API, method, or routine that is associated with data module 410.

Analyzer 435 may refer to a component that is capable of reading code 425 that has already been compiled, and is capable of deciphering a functional intent or other designated functional characteristic of code 415 based on established criteria. Thus, analyzer 435 may be further capable of associating an appropriate persona or classification with code 415.

Annotated guidance 440 may refer to a text file that is associated with code 415 that articulates the persona or classification that has been assigned to code 415 by analyzer 435. Additionally, annotated guidance 440 may articulate a rule or other form of programming guidance corresponding to the particular persona or classification. Annotated guidance 440 may be presented to a customer as part of a user interface in the form of, for example, a dialog box or drop-down menu that articulates the rule or guidance associated with code 415, color-coded fonts (e.g., green for acceptable, yellow for caution, and red for prohibited).

By the description above, pertaining to FIGS. 1-4, a persona or classification may be assigned to one or more modules of code to provide qualitative programming guidance in either a managed execution environment or an unmanaged execution environment. However, the example implementations described herein are not limited to just the environment of FIG. 1, the components of FIG. 2, an execution path as in FIG. 3, or the process of FIG. 4. Technologies (e.g., tools, methodologies, and systems) associated with qualitatively annotated code 120 (see FIG. 1) may be implemented by various combinations of the components described with reference to FIGS. 2-4.

Further, the computer environment for any of the examples and implementations described above may include a computing device having, for example, one or more processors or processing units, a system memory, and a system bus to couple various system components.

The computing device may include a variety of computer readable media, including both volatile and non-volatile media, removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electric erasable programmable read-only memory (EEPROM), and the like, can also be utilized to implement the example computing system and environment.

Reference has been made throughout this specification to "an example," "alternative examples," "at least one example," "an implementation," or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that code module initialization may be implemented without one or more of the specific details, or with other methods, resources, materials, etc. In other instances, well known structures, resources, or operations have not been shown or described in detail merely to avoid obscuring aspects of the invention.

While example implementations and applications of the code module initialization have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

I claim:

1. A method of utilizing qualitatively annotated code, comprising:

analyzing code to determine a functional intent of the code and associate an annotation with the code based on the functional intent of the code, wherein the functional intent is indicative of an intended use of the code and describes one or more contexts in which the code is appropriate for use rather than describing a precise function of the code; the functional intent provided as an annotation file received into a runtime environment for processing the compiled code, the annotation file including one or more of a classification or persona to represent qualitative information on the intended use of the code;

compiling the code;

using a processor coupled to a system memory, receiving a catalytic action to affect compiled code;

in response to receiving the catalytic action, using the processor to read the compiled code and the associated annotation file to decipher the functional intent or other designated functional characteristics of the compiled code based on established criteria;

based on the deciphered functional intent or other designated functional characteristics of the compiled code, associating the classification with the compiled code, wherein the classification is at least one of:

inner-loop code that is likely to be called in a bigger loop by a client application, program, function or other assemblage of code, as part of a bigger algorithm, throughput code that is likely to be used in a batch process or service process, interactive code that is likely to be used by part of an application, program, function or other assemblage of code that is driven by interactive events, or startup code that is likely to appear on a startup path for a corresponding application, program, function or other assemblage of code; and displaying to a user in the runtime environment guidance based on the classification associated with the compiled code, the compiled code associated with an application programming interface (API) of the runtime environment, the guidance comprising:

for a classification of inner-loop code, advising that such code may be called by code that is assigned of a classification of throughput code, interactive code or startup code;

for a classification of throughput code, advising that throughput code is not functionally compatible with inner-loop code and therefore may not be called by inner-loop code;

for a classification of interactive code, advocating calling code that has been assigned an inner-loop classification;

for a classification of startup code, advising discouragement or denial of calls from code that has been assigned another classification;

wherein the programming guidance indicates at least one of:

whether the API is functionally compatible with a method that is calling the API;

whether a called method is functionally compatible with the API; or a method that may be successfully called by the API.

* * * * *